United States Patent
Couasnon

[19]

[11] Patent Number: 5,772,173
[45] Date of Patent: Jun. 30, 1998

[54] LOCKABLE SLIDE, ESPECIALLY FOR AUTOMOBILE VEHICLE SEATS

[75] Inventor: Christian Couasnon, Flers, France

[73] Assignee: Bertrand Faure Equipements S.A., Boulogne Cedex, France

[21] Appl. No.: 738,359

[22] Filed: Oct. 25, 1996

[30] Foreign Application Priority Data

Nov. 8, 1995 [FR] France ................................ 95 13370

[51] Int. Cl.⁶ .................................................. F16M 13/00
[52] U.S. Cl. ............................................................ 248/430
[58] Field of Search .................................. 248/430, 429, 248/424; 296/65.1

[56] References Cited

U.S. PATENT DOCUMENTS

| | | | |
|---|---|---|---|
| 4,712,759 | 12/1987 | Sugama et al. | 248/429 |
| 5,076,529 | 12/1991 | Dove et al. | 248/900 X |
| 5,242,144 | 9/1993 | Williams et al. | 248/429 |
| 5,425,522 | 6/1995 | Retzlaff | 248/430 X |

FOREIGN PATENT DOCUMENTS

| | | |
|---|---|---|
| 0 408 932 | 1/1991 | European Pat. Off. . |
| 404 419 | 6/1966 | Germany . |
| 2821605 | 12/1978 | Germany .............................. 248/429 |
| 0 094 438 | 11/1983 | Germany . |
| 42 42 895 | 11/1993 | Germany . |
| 43 37 293 | 12/1994 | Germany . |
| 61-044037 | 3/1986 | Japan . |
| 413397 | 7/1934 | United Kingdom . |

*Primary Examiner*—Ramon O. Ramirez
*Attorney, Agent, or Firm*—Pollock, Vande Sande & Priddy

[57] ABSTRACT

A slide includes two sections sliding in relation to each other, and a locking device, attached to the first section, which includes at least two elastically flexible blades. Each bade includes, at one end, teeth adapted to mate in a locking position, with notches made in the second section. The slide includes an unlocking device adapted to act simultaneously on the blades by elastically deflecting them, so that the teeth of all the blades are disengaged from the notches. By offsetting the locking teeth on one blade in relation to the other by a distance equal to K*p+p/n (K: whole number; p: notch pitch; n: number of blades), a reduced locking pitch equal to p/n is obtained. The invention is especially useful for adjusting the position of automobile vehicle seats.

9 Claims, 3 Drawing Sheets

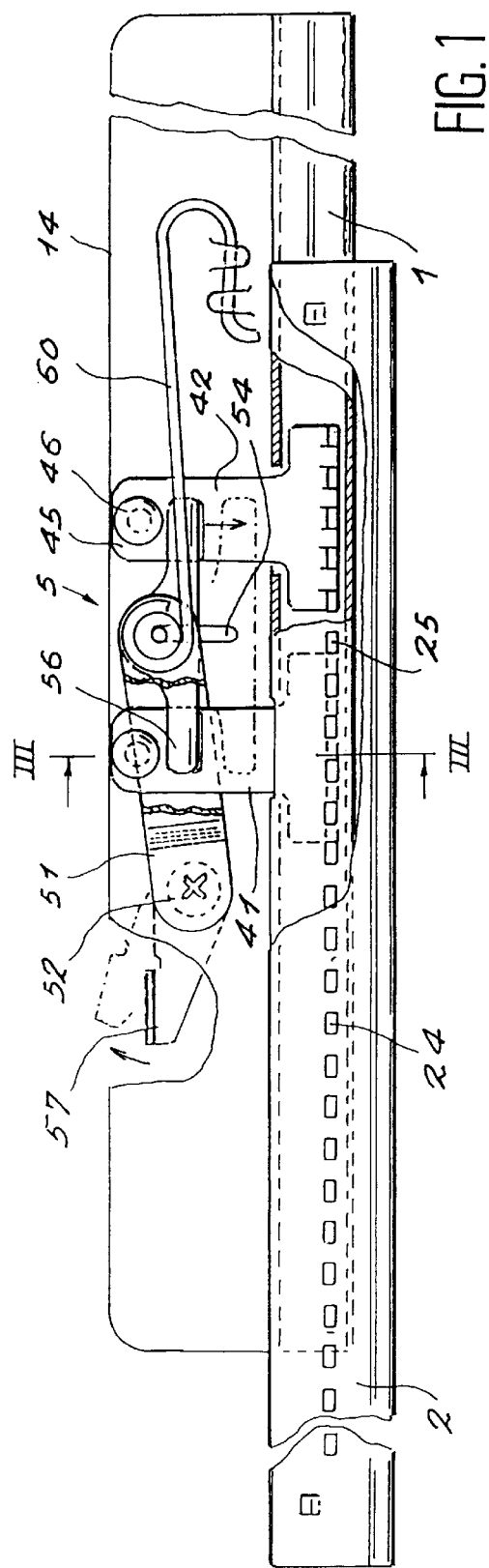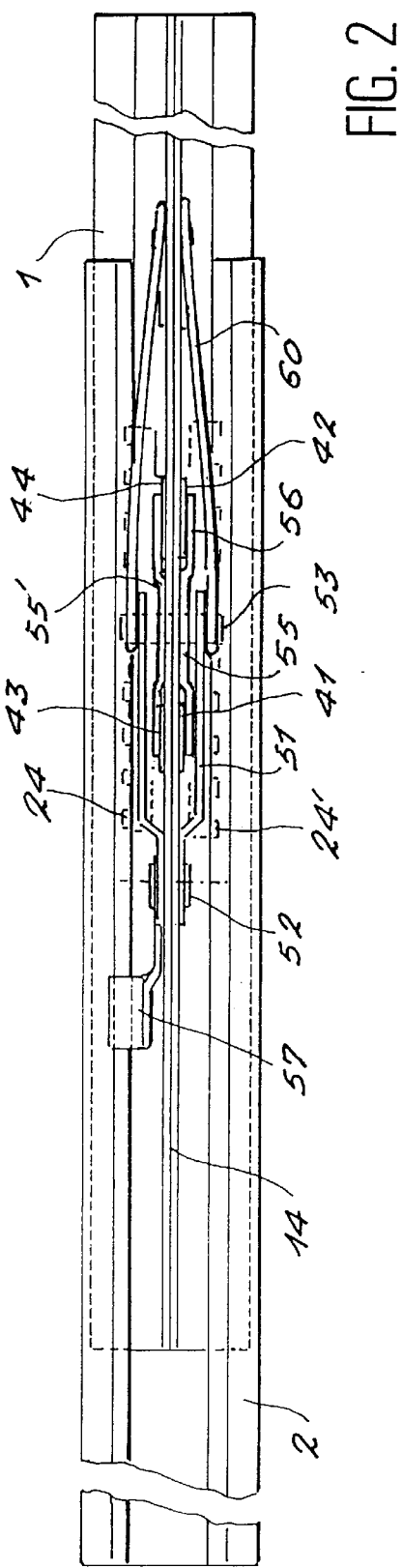

LOCKABLE SLIDE, ESPECIALLY FOR AUTOMOBILE VEHICLE SEATS

FIELD OF THE INVENTION

This invention concerns a lockable slide, especially for automobile vehicle seats. Such slides are especially used to attach a seat to the floor of the vehicle, allowing the longitudinal position of the seat to be adjusted, that is in the front-rear direction, and restraining the seat in the selected adjustment position.

BACKGROUND OF THE INVENTION

These slides conventionally include two profiled elements sliding in relation to each other. For a slide providing longitudinal adjustment of a seat, one of these elements, for example a female section, is attached to the floor, the other element, the male section, being attached to the frame of the seat. Locking of travel is conventionally ensured by a lock attached to a section, generally the male section, which mates in locked position with one or more notches of a set of notches made in the other section.

Generally, the lock is pushed elastically into locked position by elastic return means, such as springs, and unlocking control means allow the lock to be disengaged from the notches, countering the action of the return means, allowing the slide to move. When the required adjustment position is reached, releasing the control means frees the lock which elastically returns to locked position by engaging in the notches in the female section.

However, it may happen that, in selected adjustment position, the lock is not exactly opposite a notch and therefore cannot engage in it. In this case, it is necessary to slide the seat forwards or rearwards to place it in a position where locking is possible.

For practical reasons related to the making of the notches and the lock, and the mechanical strength, the pitch of the notches cannot be reduced below a minimum and, by virtue of this, the position where locking is possible may be offset in relation to required adjustment position. This offset, even relatively small, may procure a certain discomfort for the user. Moreover, it may happen that the user, when he has placed his seat in the desired adjustment position, does not concern himself with its effective locking, which may occur especially as locking is achieved by the elastic return of the lock and does not result from a voluntary action on his behalf.

In such a case, the position of the seat is adjusted, but it is not locked. The result is that an acceleration or a deceleration of the vehicle may cause the slide to slide until it reaches a position where locking is possible. Even if this movement is relatively small, the acceleration obtained during this movement may be high, for example in case of an impact, and lead to very high loads on the lock and notches during their engagement, and these loads may damage the locking mechanism, or even prevent its operation, which may be very dangerous as the slide, and therefore the seat, can then slide freely.

To solve these problems, it has already been proposed, for example in document EP 408 932, to use several locks offset longitudinally so that at least one of these locks will be in a position where locking is possible, whereas the other lock or locks will not be opposite a notch. Such a system indeed reduces the pitch of positions where locking is possible in relation to slide notch pitch.

Moreover, conventional locking systems include lock translation and rotation guide means and a return spring. In the above mentioned case, where several locks are used, each one must have its own guide means and its own return spring as it must be possible to engage each lock independently of the others. This considerably complicates the design of the locking system and increases the cost.

BRIEF DESCRIPTION OF THE INVENTION

The purpose of this invention is to solve the above mentioned problems and especially aims at supplying a simple and reliable low-cost locking system, especially suitable for manufacturing lockable slides with a reduced locking pitch.

With these targets in mind, the subject of the invention is a slide, especially for automobile vehicle seats, including a first section and a second section, sliding in relation to each other, and locking means attached to the first section and adapted to mate with one or more notches of a set of notches spaced at regular intervals and made in the second section, characterised in that the locking means include at least two elastically flexible blades, each including, at one end, locking elements adapted to mate, in a locked position, with the said notches, and being attached to the first section at a distance from the said locking elements, in that the blade locking elements are offset, in relation to the notches in which they engage, on one blade in relation to the other and in longitudinal sliding direction, by a distance equal to $K*p+p/n$, "K" being a whole number, "p" being the pitch of the notches and "n" being the number of blades, and in that it includes suitable unlocking means to simultaneously act on the said blades, by deflecting them elastically, so that the locking elements of all the blades are disengaged from the notches.

The locking and unlocking system according to the invention has various advantages which will be described below.

On account of the offset of the locking elements, on one blade in relation to the other, locking is ensured alternately by one or the other of the blades, the distance between two possible locking positions being reduced to a fraction p/n of notch pitch.

In addition, the use of several blades increases slide locking safety as, if one blade fails, locking can still be achieved by another blade, without this complicating the adjustment operations as a single unlocking command acts simultaneously on all the blades.

In a first design, the slide includes at least two blades placed adjacent to each other in the longitudinal direction, and an unlocking control part extending longitudinally opposite the said blades, the said unlocking control part moving perpendicular to the longitudinal direction and comprising a plunger acting simultaneously on the said blades. In this design, all the blades are arranged one after each other in the longitudinal direction, with the locking elements offset as described above, and can engage in the notches of a given set of notches.

Another design consists in providing two sets of notches made respectively on two sides of the second section, and two blades attached to the first section in a given longitudinal position and arranged so that the locking elements of each blade mate respectively with one of the said sets of notches.

The overall length of the locking means can therefore be divided by two. In this second design, the notches of the two sets of notches can be located accurately opposite each other, and the locking elements of the two blades located in the same longitudinal position are offset as described above. Of course, the same result can be obtained by an arrangement in which the said sets of notches are offset longitudinally by a distance lower than the pitch of the notches, this distance being preferably equal to notch half pitch, and the locking elements of the two blades can then be located in the same longitudinal position. It is clear that, in this case, the offset of the locking elements must be considered in relation to each set of notches, as it is not the locking elements which are actually offset, on one blade in relation to the other, but the notches which are offset, on one set of notches in relation to the other. It is easy to understand that these two possibilities are equivalent from a geometrical viewpoint and can be combined together and with the arrangements of the first design to increase the number of blades used and thus reduce the pitch of the possible locking positions accordingly.

According to other specific arrangements of the invention:

the first section is a male section sliding between two flanges of the second section comprising a female section, the male section includes a longitudinal rib which extends away from the female section, and each blade is attached by one end to the said rib and extends towards the female section, and the said locking elements are teeth which extend more or less perpendicular to the blade, to engage, in locked position, in the said notches made for this purpose in the said flanges of the female section;

the teeth pass through the windows made in the sides of the male section which extend to against the said flanges of the female section;

the unlocking means include:

an unlocking control part shaped to act simultaneously on several blades, a pin with its axis perpendicular to the said rib, guided in translation on the rib, perpendicular to the longitudinal direction, and to which the unlocking control part is fixed, an unlocking lever hinged on the rib and accommodating the pin, and a return spring of the said lever.

Other characteristics and advantages of the invention will appear in the description which will be given as an example of a slide in compliance with the invention, including four blades and allowing locking to be obtained every notch quarter pitch. Refer to the appended drawings on which:

BRIEF DESCRIPTION OF THE FIGURES

FIG. 1 shows a side view of the slide,

FIG. 2 shows a top view of this slide,

DETAILED DESCRIPTION OF THE INVENTION

Figure 3:
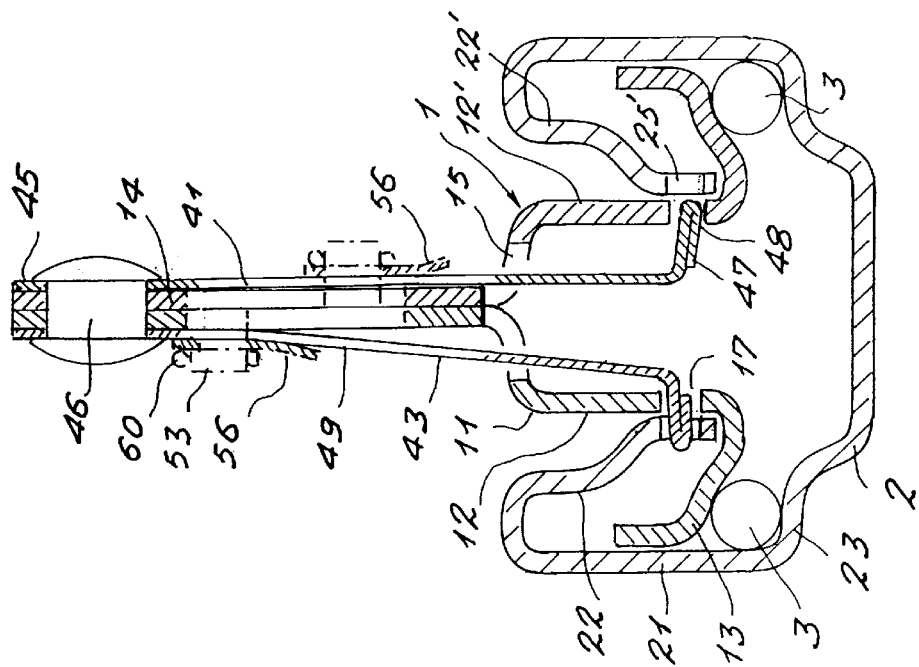
FIG. 3 shows a sectional view through III—III of FIG. 1, represented in locked position on the left hand part of the figure, and in unlocked position on the right hand part.

The slide shown on FIGS. 1 to 3 includes a male section 1 and a female section 2. The male section 1 is designed to be attached to the frame, not shown, of an automobile vehicle seat, and the female section 2 is designed to be attached to the floor of the vehicle.

The female section 2 is generally U-shaped and open at the top the flanges 21 of which are extended by flange returns 22, 22' facing towards the inside and downwards.

The male section 1 includes a central part 11 of U-shaped section open at the bottom, the flanges 12, 12' of which are extended by flange returns 13, facing outwards, and which insert under the flange returns 22, 22' of the female section. The flange returns 13 of the male section and the angles 23 between the flanges 22 and the bottom of the female section comprise the raceways for the balls 3, which facilitate the sliding of the male section in the female section.

Two rows 24, 24' of notches 25 are made in the edges of the flange returns 22, 22' respectively, which extend parallel to and in the direct vicinity of the flanges 12, 12' of the male section 1.

The male section 1 includes a longitudinal rib 14 which extends upwards from the bottom of the U-shaped central part 11.

Locking means are provided to restrain the translation of the male section in relation to the female section. These locking means include, in the example shown, four blades 41, 42, 43, 44 made from an elastically deformable material, for example, spring steel. Each of these blades is attached by an upper end 45 to the side of the rib 14, for example by a rivet 46, and extends downwards passing through a window 15 made in the bottom of the U-shaped central part 11 of the male section.

Two blades 41, 42 are placed on one side of the rib 14, and two other blades are placed on the other side of this rib. The blades 41 and 43 (42, 44 respectively) are located in the same longitudinal position and attached by same rivet 46.

The lower end 47 of each blade is folded substantially at right angles and cut to form the locking teeth 48 whose width is more or less equal to the length of the notches 25 in the female section. When the blade is in locked position, such as the blade 43 shown on the LEFT HAND part of FIG. 3, the end 47 of the blade passes through a window 17 made in the flange 12 of the male section and the teeth 48 engage in the notches 25 of the female section. As the edges of the flange returns 22 are located practically against the flanges 12 of the male section, the loads tending to make the male section slide in the female section lead therefore only to shear stresses in the teeth 48, stresses to which the steel of which the blades are made offers very good resistance.

We can see that in this locked position, the mid area 49 of the blade is slightly inclined from the vertical and moved away from rib 14, allowing it to be deflected elastically to bring it into the unlocking position, shown for the blade 41 on the right hand part of FIG. 3, where the teeth 48 are disengaged from the notches 25.

The unlocking means 5 include an unlocking lever 51 installed so as to pivot on the rib 14 and one end of which positioned away from the pivot 52 and located in an intermediary longitudinal position between the blades 41, 43 and 42, 44 carries a pin 53 with its axis perpendicular to the longitudinal direction. This pin 53 is guided in translation perpendicular to its axis, and restrained in rotation, in a slot 54 extending vertically in the rib 14. Two unlocking control parts 55, 55', arranged respectively on either side of the rib are securely attached to the pin 53. Each unlocking part is shaped so that its ends 56 extend longitudinally up to each of the two blades 41, 42 (43, 44 respectively) located on the same side of the rib 14. The distance between each unlocking part 55, 55' and the rib 14 is determined so that, when the unlocking means are in locked position, as shown on FIG. 1 and on the LEFT HAND part of FIG. 3, the said ends 56 of the unlocking parts are just in contact with the faces of the blades facing outwards.

A return spring 60 is connected by one end to the pin 53 and attached by its other end to the rib 14, so that it returns pin 53 upwards, to against the upper end of the slot 54.

Acting on an unlocking handle 57, connected to lever 51, in the direction shown by the arrow (see FIG. 1), pivots this lever which pushes the pin 53 downwards countering the return force of the spring 60.

By doing this, the pin 53 drives the unlocking parts 55, 55' the ends 56 of which, by moving vertically, push the blades 41, 42, 43, 44 back towards the rib 14, by sliding against their inclined mid areas 49, which causes the simultaneous disengagement of the teeth 48 of all the blades from the notches 25.

Figure 4:
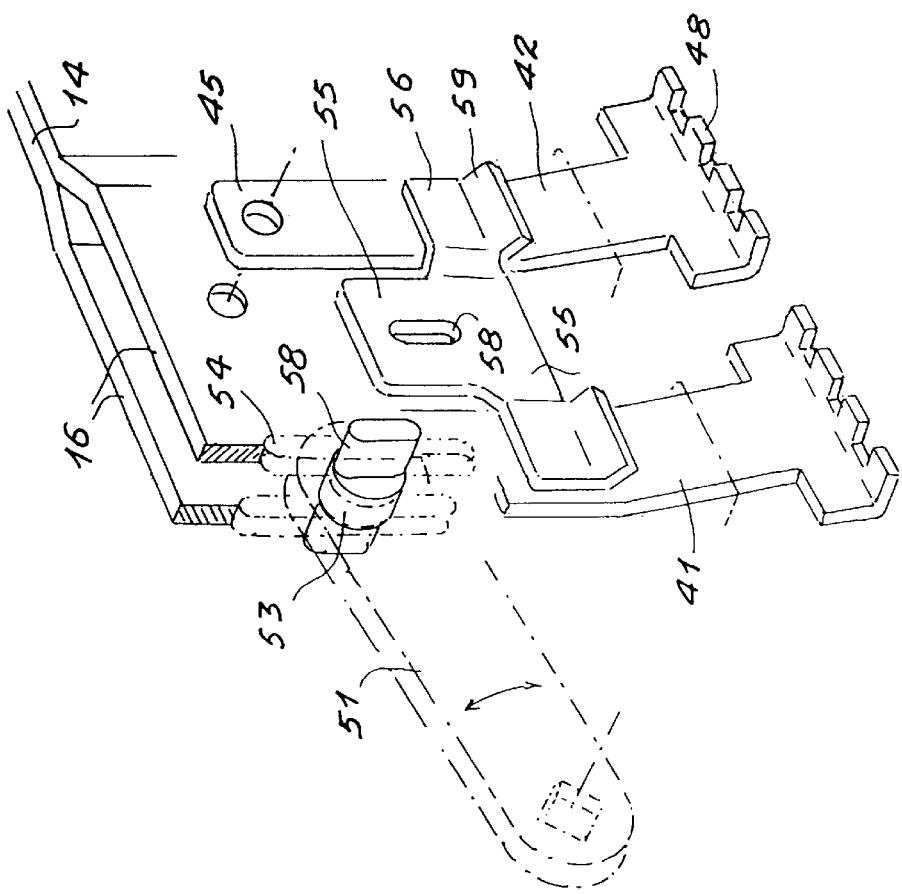
FIG. 4 shows a partial perspective cut view of a design variant of the unlocking control means illustrating the principle of the unlocking system.

The drawing on FIG. 4 shows a design variant of the unlocking system, where the lever 51, instead of having two branches extending on either side of the rib 14 as shown on FIG. 2, is formed of a part placed between two walls 16 constituting the rib 14, these walls being spaced apart at the level of the unlocking system. In this variant, the pin 53 has flattened ends 58 which can slide in the slots 54 made in each of the said walls 16, and stop the pin from rotating. The unlocking parts have elongated holes 58 into which the flattened ends 58 penetrate, which ensures, in a simple manner, the holding of the said unlocking parts in the correct position.

We shall see that, to facilitate the sliding of ends 56 of the unlocking parts 55 on the blades 41, 42, these ends include an inclined part 59, adapted so as to bear on the thrust area 49 of the blades without risk of seizure during the relative sliding movements.

We shall now describe the features of the slide specially used to allow it to be locked with a locking pitch equal to a quarter of the pitch of notches 25.

Figure 5:
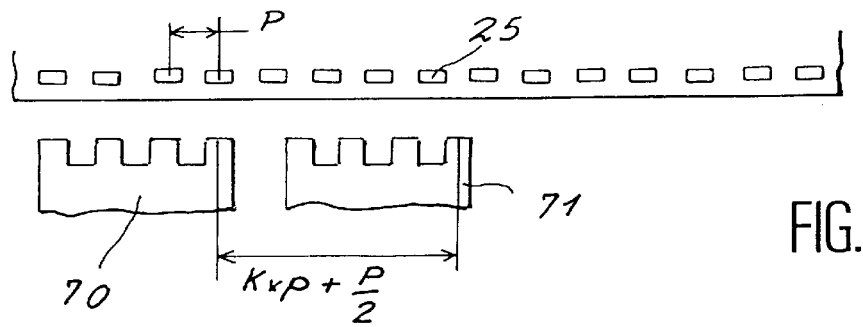
FIGS. 5, 6 and 7 illustrate different possibilities for the relative arrangement of the locking elements to obtain locking pitches equal to one half, one third and one quarter of the notch pitch respectively.
Figure 6:
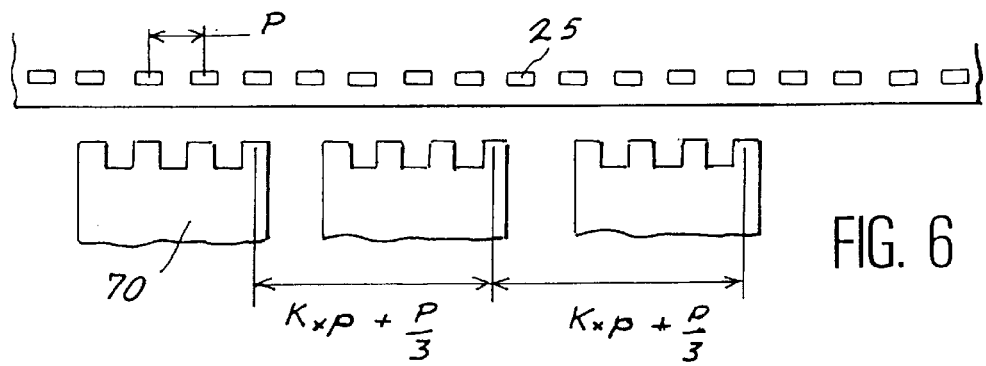
Figure 7:
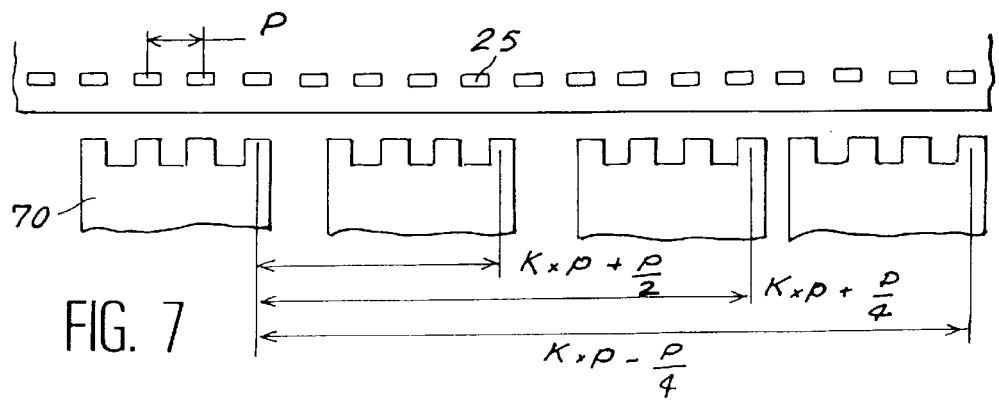

Before this, we shall describe, in relation to FIGS. 5, 6 and 7, the relative arrangement principle of the locking elements allowing a locking pitch lower than the notch pitch to be obtained.

The drawing on FIG. 5 illustrates the case where two locks 70, 71 are positioned one beside each other in slide longitudinal direction. Here, the row of notches 25 has a pitch equal to "p". The two locks are positioned so that the distance between the teeth 48 is equal to $K*p+p/2$.

Thus, when the teeth of one of the locks, for example the lock 70, are located just opposite the notches 25, the teeth of the second lock 71 are located in an intermediary position between two notches.

Locking can therefore be achieved by engagement of the teeth of the first lock 70 in the notches 25. After unlocking and relative movement through an odd number of half-pitches, that is $(2m+1) p/2$, "m" being any whole number, the teeth of the second lock will be located opposite the notches; locking can therefore be achieved by this second lock 71, the teeth of the first lock being located in an intermediary position between two notches.

Locking can therefore be ensured every half-pitch, alternately with one lock or the other.

FIG. 6 illustrates in a similar way the case where three locks are used, the teeth of which are offset by a distance equal to $K*p+p/3$, allowing a locking pitch equal to a third of the pitch "p" of notches 25 to be obtained.

Generally speaking, by using "n" locks the teeth of which are offset from one lock to another by $K*p+p/n$, "K" being a whole number, the locking pitch that will be obtained is equal to $p/n$.

We can easily understand that the four blades 41 to 44 used in the slide described above as an example correspond functionally to the four locks shown on FIG. 7, allowing, for example, for a notch pitch "p" of 10 mm, a locking pitch of $p/4$, that is 2.5 mm, to be obtained.

The lock arrangement, in compliance with the example described, that is arranged on the two sides of the slide, has the advantage of reducing the overall length of the system and in simplifying the design of the unlocking control means.

As already stated, the notches of the two rows 24, 24' can be made accurately opposite each other, in which case the teeth 48 of the blades 41 to 44 are offset in relation to each other by a distance of $K*p+p/4$. According to another possibility, the notches of the two rows can be offset longitudinally by $p/2$, the teeth of the two blades 41, 43 located in the same longitudinal position are then also located so as to correspond, and the teeth of the two other blades 42, 44 are offset in relation to the blades 41, 43 by $K*p+p/4$.

Figure 8:
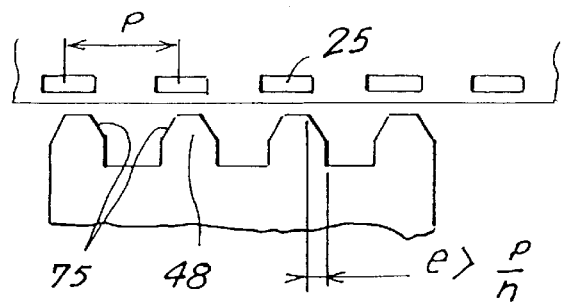
FIG. 8 illustrates the use of a specific form for the locking elements, allowing locking to be achieved even when the seat is still in an intermediary adjustment position, between two positions where accurate locking is possible.

The drawing on FIG. 8 schematically illustrates an improvement where the locking teeth 48 have lateral chamfers 75, of length "l" greater than $p/n$, "n" being the number of locks. This arrangement does not alter the effective locking pitch described above. However, irrespective of the adjustment position selected by the user, and even if this position is between two positions where locking is possible, the ends, located between the two chamfers, of the teeth of at least one blade will be mandatorily opposite the notches in the slide, on account of the fact that the offset between the notches and the teeth of at least one blade is at maximum $p/n$ and that the chamfer is at least slightly greater than this value.

In such an intermediary position, the teeth of one of the blades can at least slightly enter into the notches of the female section and ensure start of locking which will be reinforced by only a very low sliding movement of the slide, facilitated by the load resulting from the interaction of the chamfers on the edges of the notches.

A specific advantage of the locking means according to the invention results from the making of a number of locking teeth on each blade. Indeed, this allows the width of the teeth to be reduced without reducing the locking resistance to the loads tending to make the slide slide, as these loads are distributed over all the teeth of a blade. This reduction in the width of the teeth allows the row or rows of notches to be made with a low pitch, and therefore gives a very low pitch for the possible locking positions.

The invention is not limited to the design given above only as an example. In particular, the shape of the blades, their method of attachment to the section and the technology for making the unlocking means can easily be modified by a person skilled in the art without falling outside the scope of the invention.

I claim:

1. A slide for automobile vehicle seats, including a first section and a second section, sliding in relation to each other, and locking means attached to the first section and adapted to mate with one or more notches of a set of notches spaced at regular intervals in the second section, wherein the locking means include at least two elastically flexible blades each including, at one end, locking elements adapted to mate, in a locking position, with the notches, and being attached to the first section at a distance from the locking elements, in that the locking elements of the blades are offset, in relation to the notches which they engage, on one blade in relation to the other and in longitudinal sliding direction, by a distance equal to $K*p+p/n$, "K" being a whole number, "p" being the notch pitch, and "n" being the number of blades, the slide further including unlocking means adapted to act simultaneously on the blades, by making them deflect elastically, so that the locking elements of all the blades are disengaged from the notches.

2. A slide in accordance with claim 1, further wherein the at least two blades are placed adjacent to each other in the longitudinal direction, and an unlocking control part extending longitudinally opposite the blades, the unlocking control part being mobile perpendicular to the longitudinal direction and forming a plunger which acts simultaneously on the blades.

3. A slide in accordance with claim 1, wherein two sets of notches are made respectively in two sides of the second section, and two blades are attached to the first section in the same longitudinal position and arranged so that the locking elements of each blade mate respectively with one of the sets of notches.

4. A slide in accordance with claim 3, wherein the sets of notches are offset longitudinally by a distance lower than the notch pitch.

5. A slide in accordance with claim 3, wherein the two blades are attached to the first section by a common attaching item.

6. A slide in accordance with claim 1, wherein the first section is a male section sliding between two flanges of the second section that is a female section, the male section including a longitudinal rib which extends away from the female section, and the locking elements are teeth which extend substantially perpendicular to the blade, to engage, in locked position, in the notches made for this purpose in the flanges of the female section.

7. A slide in accordance with claim 6, wherein the teeth pass through windows formed in the sides of the male section, the teeth extending to the flanges of the female section.

8. A slide in accordance with claim 6, wherein the unlocking means further comprises:

an unlocking control part shaped to act simultaneously on several blades, a pin with its axis perpendicular to the rib, guided in translation on the rib, perpendicular to the longitudinal direction, and to which the unlocking control part is attached, an unlocking lever hinged on the rib and accommodating the pin, and a return spring for the lever.

9. A slide in accordance with claim 8, wherein each blade further comprises a portion, located between its attachment end and the teeth, the portion including a thrust area on which the unlocking control part acts, the latter including, at each of the blades on which it acts, an inclined portion adapted to bear on the thrust area of each blade.

* * * * *